United States Patent
Samie et al.

(10) Patent No.: US 8,010,265 B2
(45) Date of Patent: Aug. 30, 2011

(54) EFFECTIVE DRIVELINE VIBRATION DETECTION ALGORITHM IN TRANSMISSION TCC SLIP CONTROL

(75) Inventors: Farzad Samie, Franklin, MI (US); Chunhao J. Lee, Troy, MI (US); Paul G Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 585 days.

(21) Appl. No.: 12/191,919

(22) Filed: Aug. 14, 2008

(65) Prior Publication Data

US 2009/0150032 A1    Jun. 11, 2009

Related U.S. Application Data

(60) Provisional application No. 61/012,194, filed on Dec. 7, 2007.

(51) Int. Cl.
*B60W 10/02* (2006.01)
*B60K 23/02* (2006.01)
(52) U.S. Cl. .......................................... 701/55; 477/176
(58) Field of Classification Search .................. 701/50, 701/55; 477/176
See application file for complete search history.

(56) References Cited

U.S. PATENT DOCUMENTS

| 4,466,311 | A | | 8/1984 | Hiramatsu |
| 4,468,988 | A | | 9/1984 | Hiramatsu |
| 4,518,044 | A | * | 5/1985 | Wiegardt et al. ............... 172/7 |
| 5,121,820 | A | * | 6/1992 | Brown et al. .................. 192/3.3 |
| 5,474,506 | A | * | 12/1995 | Palansky et al. ............... 477/63 |
| 7,286,922 | B1 | * | 10/2007 | Fischer et al. ................. 701/51 |
| 2004/0186645 | A1 | * | 9/2004 | Kohno et al. .................. 701/51 |
| 2005/0107215 | A1 | * | 5/2005 | Werner et al. ................ 477/174 |
| 2007/0287594 | A1 | * | 12/2007 | DeGeorge et al. ............ 477/176 |
| 2008/0234106 | A1 | * | 9/2008 | Maguire et al. .............. 477/169 |
| 2008/0288146 | A1 | * | 11/2008 | Beechie et al. ................. 701/58 |
| 2010/0312449 | A1 | * | 12/2010 | Savaresi et al. ................ 701/82 |

FOREIGN PATENT DOCUMENTS

| JP | 06-034035 | 2/1994 |
| JP | 2003-048463 | 2/2003 |

OTHER PUBLICATIONS

Web Forum post by "kamek". "Clutch vibration/shudder when engaging gear—clutch slipping?" http://www.e90post.com/forums/showthread.php?t=463335. Dec. 8-11, 2010. Downloaded on May 3, 2011.*

* cited by examiner

*Primary Examiner* — Mark Hellner
*Assistant Examiner* — Ari M Diacou
(74) *Attorney, Agent, or Firm* — John A. Miller; Miller IP Group, PLC

(57) ABSTRACT

A method for adjusting the slip of a torque converter for a plurality of selected engine speeds, transmission gears and engine torque. A sensor is used to determine vibrations transmitted through the torque converter to the driveline of the vehicle. The sensor signal is sent to a controller where it is converted to the frequency domain. If the amplitude of the frequency signal exceeds a threshold, then the algorithm increases/decreases the converter slip until the driveline vibrations equal a threshold.

20 Claims, 4 Drawing Sheets ated to the frequency domain. If the amplitude of the frequency signal exceeds a predetermined threshold, then the algorithm increases the converter slip until the frequency vibrations are reduced below the threshold.

EFFECTIVE DRIVELINE VIBRATION DETECTION ALGORITHM IN TRANSMISSION TCC SLIP CONTROL

CROSS-REFERENCE TO RELATED APPLICATIONS

This application claims priority to U.S. Provisional Patent Application Ser. No. 61/012,194, filed Dec. 7, 2007, titled "Aggressive Torque Converter Clutch Slip Control Design through Driveline Torsional Velocity Measurements."

BACKGROUND OF THE INVENTION

1. Field of the Invention

This invention relates generally to a system and method for setting the slip in a torque converter of a vehicle and, more particularly, to a system and method for providing a minimum torque converter slip in response to changes in engine speed and transmission gears so as to minimize vehicle driveline vibrations and provide good fuel economy.

2. Discussion of the Related Art

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine. Thus, the torque converter can disengage the engine crank shaft from the transmission input shaft during vehicle idling conditions to enable the vehicle to stop and/or to shift gears.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the slip mode, the TCC controls the pressure of hydraulic fluid in the torque converter so that the slip between the torque converter impeller and the turbine can be set so that is does not exceed a predetermined slip.

Various engine torque perturbations, engine pulses and other engine noises, generally in the range of 30-300 Hz, can be passed through the torque converter from the engine to the transmission and onto the vehicle driveline, which are felt by the vehicle occupants as shaking or vibrations of the vehicle. Typically, these engine pulses and perturbations are more easily passed through the torque converter as the amount of slip between the engine and the transmission is reduced. Thus, for those times when the TCC is locked or has set the slip in the torque converter between the engine and the transmission to be very low, such engine vibrations are typically passed through to the vehicle drive-train. These types of engine disturbances and noise vary depending on the engine speed and the transmission gear.

SUMMARY OF THE INVENTION

In accordance with the teachings of the present invention, a method is disclosed for adjusting the slip of a torque converter provided between an engine and a transmission of a vehicle in real-time, where the converter slip is set by a torque converter clutch. A sensor at an output of the transmission is used to determine vibrations transmitted through the torque converter to the driveline of the vehicle. The sensor signal from the sensor is sent to a controller where it is converted to the frequency domain. If the amplitude of the frequency signal exceeds a predetermined threshold, then the algorithm increases the converter slip until the frequency vibrations are reduced below the threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for adjusting a slip for a torque converter between a vehicle engine and transmission is merely exemplary in nature, and is in no way intended to limit the invention or its applications or uses.

Figure 1:
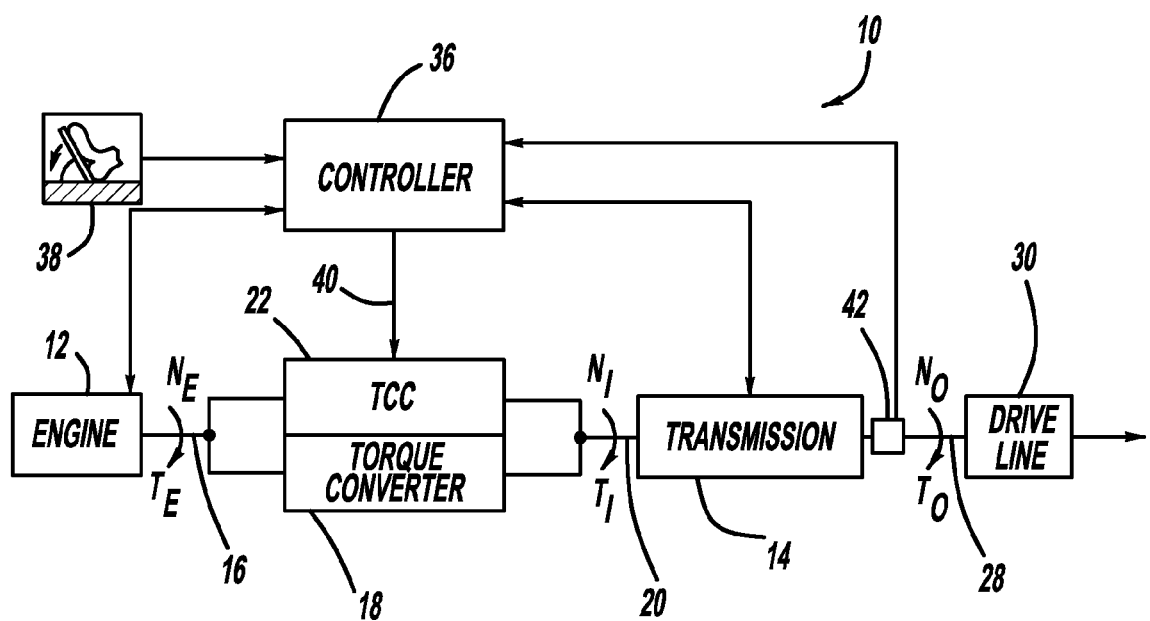
FIG. 1 is a block diagram showing various drive-train components of a vehicle.

FIG. 1 is a block diagram of various power-train components of a vehicle 10. The power-train components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed $N_E$ measured in revolutions per minute (RPM) and engine torque $T_E$ measured in Newton-meters. Likewise, the speed of the transmission 14 at its input is represented by transmission input speed $N_I$ and transmission torque $T_I$. The torque slip in the torque converter 18 is defined as $N_E-N_I$. An output shaft of the transmission 14, represented as line 28, is coupled to a driveline 30 of the vehicle 10 that distributes the engine power to the vehicle wheels (not shown) in a manner that is well understood to those skilled in the art. The speed of the output shaft 28 of the transmission 14 is represented as $N_O$ and the torque of the output shaft 28 of the transmission 14 is represented at $T_O$.

The vehicle 10 also includes a controller 36 intended to represent both an engine controller and a transmission controller. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, depending on the selected engine speed and transmission gear, the controller 36 provides a signal on line 40 to the TCC 22 to set the desired torque converter slip. A sensor 42 measures the output behavior of the transmission 14. In one non-limiting embodiment, the sensor 42 measures the rotational speed of the output shaft 28 of the transmission 14 and sends a speed signal to the controller 36. Suitable examples for the sensor 42 include an encoder, speed sensor, accelerometer, torque sensor, etc.

The present invention proposes a process for adjusting the torque converter slip in response to changes in engine speed and/or transmission gear and/or engine torque so that the slip is at a desired minimum to conserve fuel, but is not so low where engine pulses and other noise signals are transferred through the torque converter 18 to the driveline 30 and are felt by vehicle occupants. The controller 36 will select the particular slip and transmit it to the TCC 22 on the line 40 for the current engine speed, transmission gear and engine torque based on a pre-populated table that is stored in the controller 36 as a result of vehicle testing or other operations for a minimum torque converter slip that provides good fuel economy and reduced vibration transfer. One process for populating such a table can be found in U.S. patent application Ser. No. 12/043,499, titled Aggressive Torque Converter Clutch Slip Control Design Through Driveline Torsional Velocity Measurements, filed Mar. 6, 2008, assignee of this application and herein incorporated by a reference. If the selected torque converter slip for a particular engine speed, transmission gear and engine torque does not provide the desired slip for preventing vibrations from being transferred to the driveline 30, then the signal from the sensor 42 is used to determine the vibrations in the controller 36, which can then increase the torque converter slip if the vibrations exceed a predetermined threshold.

Figure 2:
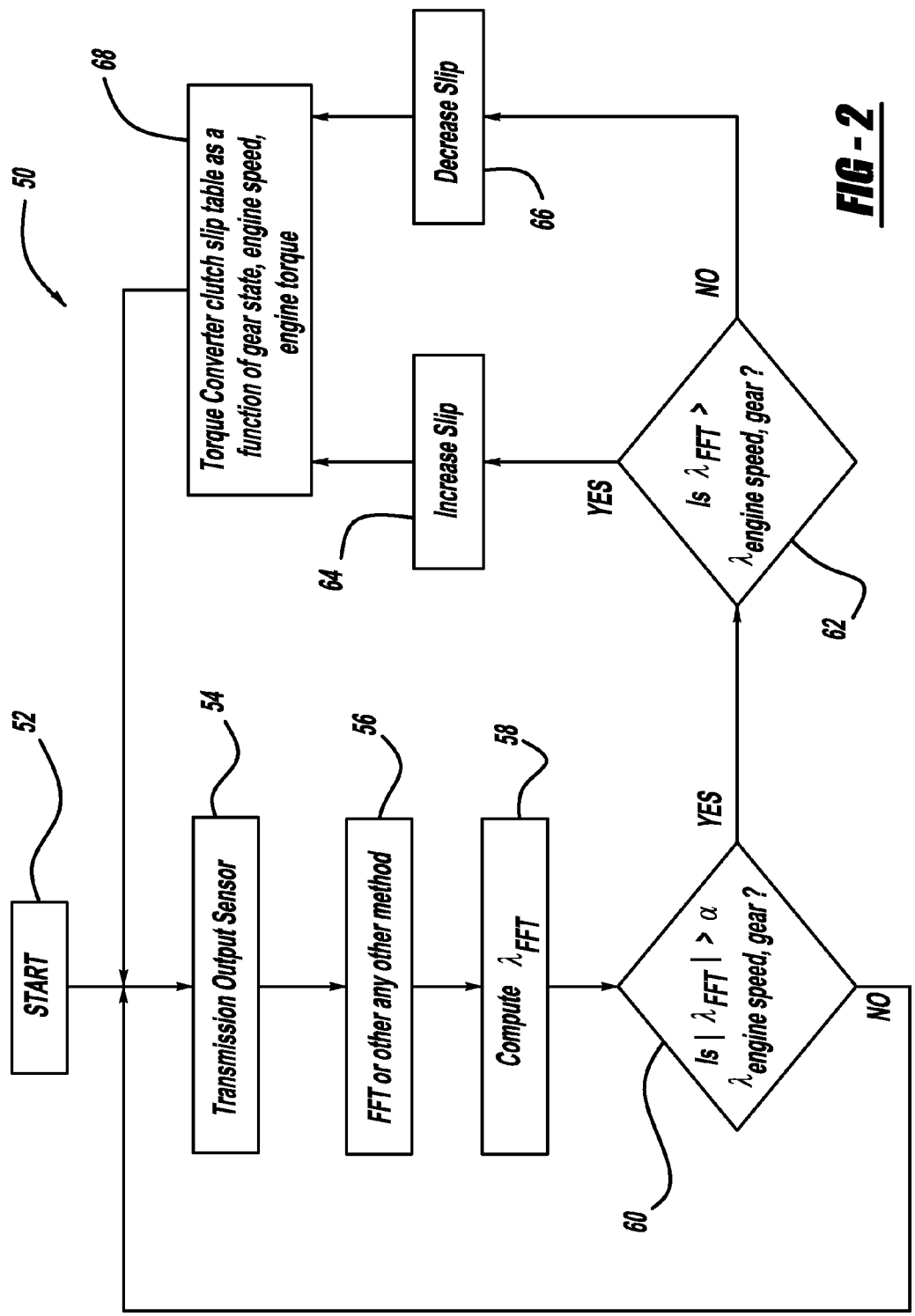
FIG. 2 is a flow chart diagram showing a process for adjusting the torque converter slip in real-time as a function of engine speed, transmission gear and engine torque so as to reduce vibrations, according to an embodiment of the present invention.

FIG. 2 is a flow chart diagram 50 showing a method for adjusting the torque converter slip for the reasons discussed above in real-time, i.e., during operation of the vehicle, according to an embodiment of the present invention. The algorithm starts at box 52. At box 54, the algorithm reads the transmission output speed signal from the sensor 42 and fast Fourier transforms the sensor signal at box 56 to convert it to the frequency domain. The algorithm then calculates a transfer torsional value $\lambda_{FFT}$ at the output of the transmission 14 in the frequency domain at box 58, which gives an amplitude value. Alternatively, the torsional amplitude could be determined by passing the transmission output sensor signal from the sensor 42 through a bandpass filter. The algorithm then determines whether the absolute value of the transfer torsional value $\lambda_{FFT}$ of the transmission output speed is greater than a set torsional value $\lambda_{engine\ speed,gear}$ scaled by a factor $\alpha$, at decision diamond 60. The set torsional value $\lambda_{engine\ speed,gear}$ is provided in a look-up table for each desirable combination of engine speed, transmission gear and engine torque.

If the transfer torsional value $\lambda_{FFT}$ is greater than the set torsional value $\lambda_{engine\ speed,\ gear}$ for the specific engine speed and gear that the vehicle is currently in, the algorithm then determines whether the transfer torsional value $\lambda_{FFT}$ is greater than the set torsional value $\lambda_{engine\ speed,gear}$ at decision diamond 62, otherwise it returns to detecting the transmission output speed at the box 54. If the transfer torsional value $\lambda_{FFT}$ is greater than the set torsional value $\lambda_{engine\ speed,gear}$ for the current engine speed and gear at the decision diamond 62, meaning that significant vibrations are being transferred through the driveline 30, the algorithm will increase the torque converter slip at box 64 for that location in the look-up table. If the transfer torsional value $\lambda_{FFT}$ is not greater than the set torsional value $\lambda_{engine\ speed,gear}$ for the current engine speed and gear at the decision diamond 62, meaning the torque converter slip is not the best for fuel economy, then the algorithm will decrease the torque converter slip at box 66 to minimize the slip value for that location in the look-up table. The new torque converter slip from the boxes 64 and 66 based on the engine speed, transmission gear and engine torque is then stored in the slip table at box 64 and replaces the previous slip value.

Figure 3:
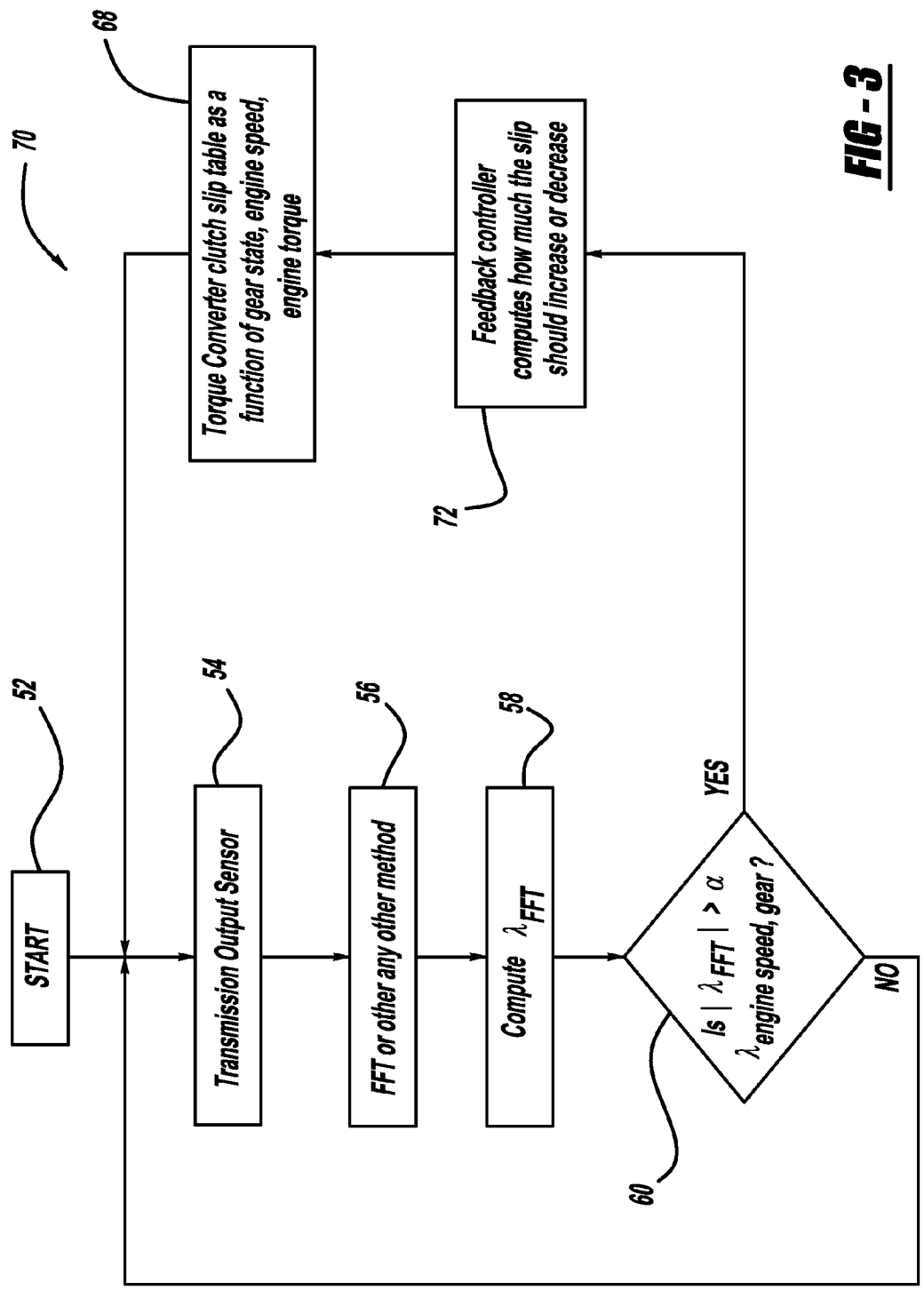
FIG. 3 is a flow chart diagram showing a process for adjusting the torque converter slip in real-time as a function of engine speed, transmission gear and engine torque so as to reduce vibrations, according to another embodiment of the present invention.

The process of the flow chart diagram 52 offers one embodiment for changing the values in the torque converter slip table in real-time during vehicle operation. In other embodiments, other processes can be incorporated for changing the torque converter clutch slip for the various engine speeds, transmission gears and engine torques. FIG. 3 is a flow chart diagram 70 showing another process for adjusting the slip table in real-time, according to another embodiment of the present invention, where like elements to the flow chart diagram 52 are identified by the same reference number. Particularly, instead of determining whether the transfer torsional value $\lambda_{FFT}$ is greater than or equal to the set torsional value $\lambda_{engine\ speed,gear}$, the system employs a feedback controller at box 72 that computes how much the slip should increase or decrease based on various vehicle parameters.

Figure 4:
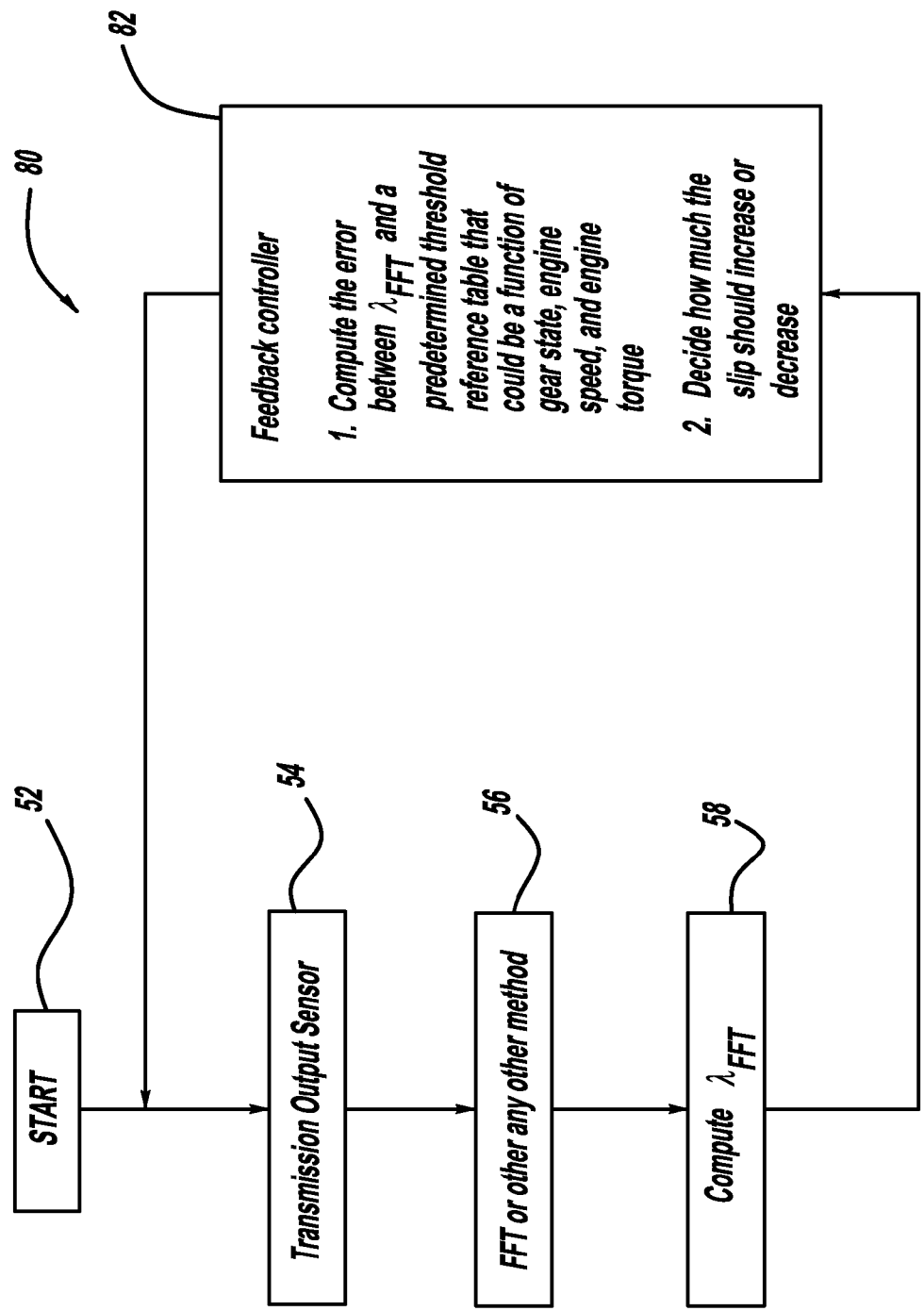
FIG. 4 is a flow chart diagram showing a process for adjusting the torque converter slip in real-time as a function of engine speed, transmission gear and engine torque so as to reduce vibrations, according to another embodiment of the present invention.

FIG. 4 is a flow chart diagram 80 showing another process for determining a minimum torque converter clutch slip in real-time based on engine speed, transmission gear and engine torque, according to another embodiment of the present invention, where like elements to the flow chart diagram 52 are identified by the same reference numeral. In this embodiment, the transfer torsional value $\lambda_{FFT}$ at the box 58 is sent to a feedback controller box 82 that calculates an error between the transfer torsional value $\lambda_{FFT}$ and a predetermined threshold reference value that can be a function of gear state, engine speed and engine torque. Based on the feedback, the feedback controller determines how much the torque converter slip should be increased or decreased for the transmission gear, engine speed and engine torque combination in the look-up table.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a desired torque converter slip for a torque converter that transfers torque between a vehicle engine and a vehicle transmission, said method comprising:

setting a predetermined minimum converter slip for the torque converter for a certain transmission gear, engine speed and engine torque;

providing a sensor signal from a sensor at an output of the transmission that measures transmission output behavior;

transforming the sensor signal to a frequency signal;

determining whether an amplitude of the frequency signal exceeds a predetermined threshold; and increasing the minimum converter slip a predetermined amount if the frequency signal does exceed the predetermined threshold, or decreasing the minimum converter slip predetermined amount if the frequency signal is below the predetermined threshold.

2. The method according to claim 1 further comprising calculating a torsional amplitude from the sensor signal using a bandpass filter.

3. The method according to claim 1 wherein transforming the sensor signal to a frequency signal includes fast Fourier transforming the sensor signal.

4. The method according to claim 1 wherein setting a predetermined minimum converter slip includes populating a table with converter slips for a plurality of different transmission gear, engine speed and engine torque combinations, and wherein increasing the minimum converter slip and decreasing the minimum converter slip includes changing the converter slip in the table for that certain transmission gear, engine speed and engine torque combination.

5. The method according to claim 1 wherein the method for determining the desired torque converter slip is performed in real-time during operation of the vehicle.

6. The method according to claim 1 wherein increasing the minimum converter slip and decreasing the minimum converter slip is performed by a feedback controller.

7. The method according to claim 6 wherein the feedback controller computes an error between the amplitude of the frequency signal and a predetermined threshold that is a function of gear state, engine speed and engine torque.

8. The method according to claim 1 further comprising determining whether the amplitude of the frequency signal exceeds a scaled reference value.

9. A method for determining a desired torque converter slip in real-time for a torque converter that transfers torque between a vehicle engine and a vehicle transmission, said method comprising:

setting a predetermined minimum converter slip for the torque converter for a selected transmission gear, engine speed and engine torque;

providing a sensor signal from a sensor that measures transmission output behavior;

analyzing the sensor signal to determine whether the predetermined minimum converter slip would cause significant engine disturbance signals to be transferred to the transmission through the torque converter; and increasing the minimum converter slip a predetermined amount if the predetermined minimum converter slip would cause significant engine disturbance signals to be transferred to the transmission through the torque converter.

10. The method according to claim 9 wherein analyzing the sensor signal includes transforming the sensor signal to a frequency signal.

11. The method according to claim 10 wherein transforming the sensor signal to a frequency signal includes fast Fourier transforming the sensor signal.

12. The method according to claim 9 wherein the converter slip for the torque converter is controlled by a torque converter clutch.

13. The method according to claim 9 further comprising calculating a torsional amplitude from the sensor signal using a bandpass filter.

14. A system for determining a desired torque converter slip for a torque converter that transfers torque between a vehicle engine and a vehicle transmission, said system comprising:

means for setting a predetermined minimum converter slip for a torque converter for a particular transmission gear, engine speed and engine torque;

means for providing a sensor signal from a sensor at an output of the transmission that measures transmission output behavior;

means for transforming the sensor signal to a frequency signal; and means for increasing or decreasing the minimum converter slip by a predetermined amount so that the driveline vibrations are near a predetermined threshold.

15. The system according to claim 14 further comprising means for calculating a torsional amplitude from the sensor signal using a bandpass filter.

16. The system according to claim 14 wherein the means for transforming the sensor signal to a frequency signal fast Fourier transforms the sensor signal.

17. The system according to claim 14 wherein the means for setting a predetermined minimum converter slip includes means for populating a table with converter slips for a plurality of different transmission gear, engine speed and engine torque combinations, and wherein the means for increasing or decreasing the minimum converter slip includes changing the converter slip in the table for that certain transmission gear, engine speed and engine torque combination.

18. The system according to claim 14 wherein the means for increasing or decreasing the minimum converter slip is a feedback controller.

19. The system according to claim 18 wherein the feedback controller computes an error between the amplitude of the frequency signal and a predetermined threshold that is a function of gear state, engine speed and engine torque.

20. The system according to claim 14 wherein the system determines the desired torque converter slip in real-time.

* * * * *